US011077443B2

(12) United States Patent
Oyen et al.

(10) Patent No.: US 11,077,443 B2
(45) Date of Patent: Aug. 3, 2021

(54) APPARATUS FOR TEMPERATURE MODULATION OF SAMPLES

(71) Applicant: UNIVERSITY OF WYOMING, Laramie, WY (US)

(72) Inventors: Kennan Oyen, Laramie, WY (US); Michael Dillon, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 542 days.

(21) Appl. No.: 15/887,220

(22) Filed: Feb. 2, 2018

(65) Prior Publication Data

US 2018/0214868 A1    Aug. 2, 2018

Related U.S. Application Data

(60) Provisional application No. 62/453,651, filed on Feb. 2, 2017.

(51) Int. Cl.
*B01L 3/00* (2006.01)
*B01L 7/00* (2006.01)
(Continued)

(52) U.S. Cl.
CPC .............. *B01L 3/50851* (2013.01); *B01L 7/00* (2013.01); *B01L 7/04* (2013.01); *G01N 1/44* (2013.01); *B01L 2300/041* (2013.01); *B01L 2300/0809* (2013.01); *B01L 2300/0883* (2013.01); *B01L 2300/0887* (2013.01); *B01L 2300/12* (2013.01);
(Continued)

(58) Field of Classification Search
CPC .......... B01L 3/50851; B01L 7/00; B01L 7/04; B01L 2300/041; B01L 2300/0809; B01L 2300/0883; B01L 2300/0887; B01L 2300/12; B01L 2300/1805; B01L 2300/1894; B01L 2400/04; G01N 1/44
See application file for complete search history.

(56) References Cited

U.S. PATENT DOCUMENTS 2,844,638 A  7/1958  Lindenblad
3,194,023 A  7/1965  Sudmeier
(Continued)

FOREIGN PATENT DOCUMENTS

WO    2004018105 A1    3/2004

OTHER PUBLICATIONS

International Search Report and Written Opinion dated Apr. 12, 2018 for Application No. PCT/US2018/016616.

*Primary Examiner* — William H. Beisner
*Assistant Examiner* — Danielle B Henkel
(74) *Attorney, Agent, or Firm* — Patterson + Sheridan, LLP

(57) ABSTRACT

Embodiments described herein relate to apparatus for temperature modulation of samples. Generally, aspects of the disclosure provide for a portable cooling and heating apparatus which enables a user to visualize a sample during cooling or heating. In one embodiment, the apparatus include a sample block, a plurality of thermoelectric modules coupled to the sample block, and a cooling block coupled to the plurality of thermoelectric modules. In another embodiment, the cooling block is in fluid communication with a fluid reservoir. Other embodiments utilize various insulating materials to influence thermal conductivity between the sample block and the cooling block to provide for enhanced temperature control and modulation.

30 Claims, 6 Drawing Sheets

(51) Int. Cl.
  *G01N 1/44* (2006.01)
  *B01L 7/04* (2010.01)
(52) U.S. Cl.
  CPC .................. *B01L 2300/1805* (2013.01); *B01L 2300/1894* (2013.01); *B01L 2400/04* (2013.01)

(56) References Cited

U.S. PATENT DOCUMENTS

| | | |
|---|---|---|
| 3,733,836 A | 5/1973 | Corini |
| 4,328,676 A | 5/1982 | Reed |
| 4,364,234 A | 12/1982 | Reed |
| 4,402,185 A | 9/1983 | Perchak |
| 4,865,986 A | 9/1989 | Coy et al. |
| 5,061,630 A | 10/1991 | Knopf et al. |
| 5,505,046 A | 4/1996 | Nelson et al. |
| 5,797,445 A | 8/1998 | Westbrooks, Jr. et al. |
| 5,871,526 A | 2/1999 | Gibbs et al. |
| 5,924,289 A | 7/1999 | Bishop, II |
| 6,131,647 A | 10/2000 | Suzuki et al. |
| 6,259,067 B1 | 7/2001 | Faries, Jr. et al. |
| 6,490,870 B1 | 12/2002 | Efremkine |
| 6,602,473 B1 | 8/2003 | Northrup |
| 6,751,963 B2 | 6/2004 | Navedo et al. |
| 6,951,114 B2 | 10/2005 | Grisham et al. |
| 7,032,389 B2 | 4/2006 | Cauchy |
| 7,141,763 B2 | 11/2006 | Moroz |
| 7,169,233 B2 | 1/2007 | Wood |
| 7,536,868 B1 | 5/2009 | Ward |
| 7,814,965 B1 | 10/2010 | Spokoiny et al. |
| 7,868,270 B2 | 1/2011 | Ookura et al. |
| 7,992,625 B1 | 8/2011 | Spokoiny et al. |
| 8,061,149 B1 | 11/2011 | Gowans et al. |
| 8,124,033 B2 | 2/2012 | Neuzil et al. |
| 8,133,671 B2 | 3/2012 | Williams et al. |
| 8,152,367 B2 | 4/2012 | Roberts et al. |
| 8,214,916 B2 | 7/2012 | Amro et al. |
| 8,225,616 B2 | 7/2012 | Wilkinson et al. |
| 8,277,763 B2 | 10/2012 | Steinmann et al. |
| 8,353,167 B2 | 1/2013 | McGann |
| 8,469,678 B2 | 6/2013 | Preston |
| 8,601,827 B2 | 12/2013 | Keisling et al. |
| 8,759,085 B2 | 6/2014 | Belgrader et al. |
| 8,962,308 B2 | 2/2015 | Wilson et al. |
| 8,978,392 B2 | 3/2015 | Blackway et al. |
| 9,057,568 B2 | 6/2015 | Malik et al. |
| 9,091,467 B2 | 7/2015 | Shreve et al. |
| 9,447,995 B2 | 9/2016 | Bloedow et al. |
| 9,470,720 B2 | 10/2016 | Dean et al. |
| 9,657,982 B2 | 5/2017 | Chou et al. |
| 2007/0010860 A1 | 1/2007 | Gafni et al. |
| 2007/0289314 A1 | 12/2007 | Liebmann et al. |
| 2008/0072689 A1 | 3/2008 | Muraishi et al. |
| 2010/0122807 A1 | 5/2010 | Harttig |
| 2010/0227063 A1 | 9/2010 | Amro et al. |
| 2010/0256824 A1 | 10/2010 | Val-Khvalabov et al. |
| 2012/0065713 A1 | 3/2012 | Greaves et al. |
| 2012/0308990 A1 | 12/2012 | TerMaat et al. |
| 2014/0011266 A1 | 1/2014 | Webster et al. |
| 2014/0230454 A1 | 8/2014 | Lupges |
| 2015/0000877 A1 | 1/2015 | Yang |
| 2015/0198358 A1 | 7/2015 | Jones, Jr. |
| 2016/0022477 A1* | 1/2016 | Schaefer .................. A61F 7/00 607/104 |
| 2017/0227676 A1 | 8/2017 | Archer et al. |

* cited by examiner

APPARATUS FOR TEMPERATURE MODULATION OF SAMPLES

CROSS-REFERENCE TO RELATED APPLICATIONS

This application claims benefit of U.S. provisional patent application Ser. No. 62/453,651, filed Feb. 2, 2017, which is herein incorporated by reference in its entirety.

BACKGROUND

Field

Embodiments of the present disclosure generally relate to apparatus for sample cooling and heating.

Description of the Related Art

Characterization and observation of biological and other material samples is commonly employed in various commercial and academic settings. Such characterization often includes studying the effects of temperature on the samples. Apparatus utilized to study the effects of temperature on samples, such as heating and cooling apparatus, are commonly employed to modulate the temperature environment to which the sample is exposed.

Conventional cooling apparatus often utilize compressor or condenser systems which recirculate a chilled fluid within a reservoir. Conventional systems often require that the samples be submerged in the fluid, thereby limiting the opportunity for visualization of the sample during cooling, the ability to change temperatures rapidly, and the ability to precisely control a temperature of the fluid. Conventional cooling apparatus also utilize refrigerants generally considered to be toxic which adversely impacts the safety of such systems. Moreover, submersion in fluid during sample characterization may adversely affect various characteristics of the sample. In addition, conventional cooling apparatus are large, heavy, and not readily portable, thus, limiting their application in various field type applications.

Accordingly, what is needed in the art are improved apparatus for temperature modulation of samples.

SUMMARY

In one embodiment, a temperature modulation apparatus is provided. The apparatus includes a sample block having a plurality of wells formed in a first surface of the sample block. A plurality of thermoelectric modules are coupled to a second surface of the sample block opposite the first surface and the plurality of thermoelectric modules are disposed in a stacked arrangement. A cooling block is coupled to the plurality of thermoelectric modules opposite the sample block, a first insulation material is coupled to the plurality of thermoelectric modules, and the first insulation material extends between the second surface of the sample block and the cooling block. A second insulation material surrounds the sample block, the first insulation material, and at least a portion of the cooling block.

In another embodiment, a temperature modulation apparatus is provided. The apparatus includes a metallic sample block having a first surface and a second surface disposed opposite the first surface and one or more wells are formed in the first surface. A plurality of thermoelectric modules are coupled to the second surface of the sample block and each thermoelectric module of the plurality of thermoelectric modules is coupled to a different region of the second surface. A cooling block is coupled to the plurality of thermoelectric modules opposite the sample block, a first insulation material is coupled to the plurality of thermoelectric modules, and a second insulation material is disposed radially outward of the sample block, the first insulation material, and the cooling block.

In yet another embodiment, a temperature modulation apparatus is provided. The apparatus includes an aluminum sample block, an aluminum cooling block, and a plurality of thermoelectric modules disposed in a stacked arrangement positioned between the sample block and the cooling block. A metal containing ceramic paste is disposed between each of the plurality of thermoelectric modules. A first insulation material is coupled to the plurality of thermoelectric modules and the first insulation material includes an adhesive coupled to a first surface of the first insulation material and a thermally reflective material coupled to a second surface of the first insulation material. A second insulation material surrounds the sample block and the plurality of thermoelectric modules, a housing surrounds the second insulation material, and a proportional-integrative-derivative controller is in electrical communication with the plurality of thermoelectric modules and the proportional-integrative-derivative controller is disposed outside of the housing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to apparatus for temperature modulation of samples. Generally, aspects of the disclosure provide for a portable cooling and heating apparatus which enables a user to visualize a sample during cooling or heating. In one embodiment, the apparatus include a sample block, a plurality of thermoelectric modules coupled to the sample block, and a cooling block coupled to the plurality of thermoelectric modules. In another embodiment, the cooling block is in fluid communication with a fluid reservoir. Other embodiments utilize various insulating materials to influence thermal conductivity between the sample block and the cooling block to provide for enhanced temperature control and modulation.

Figure 1:
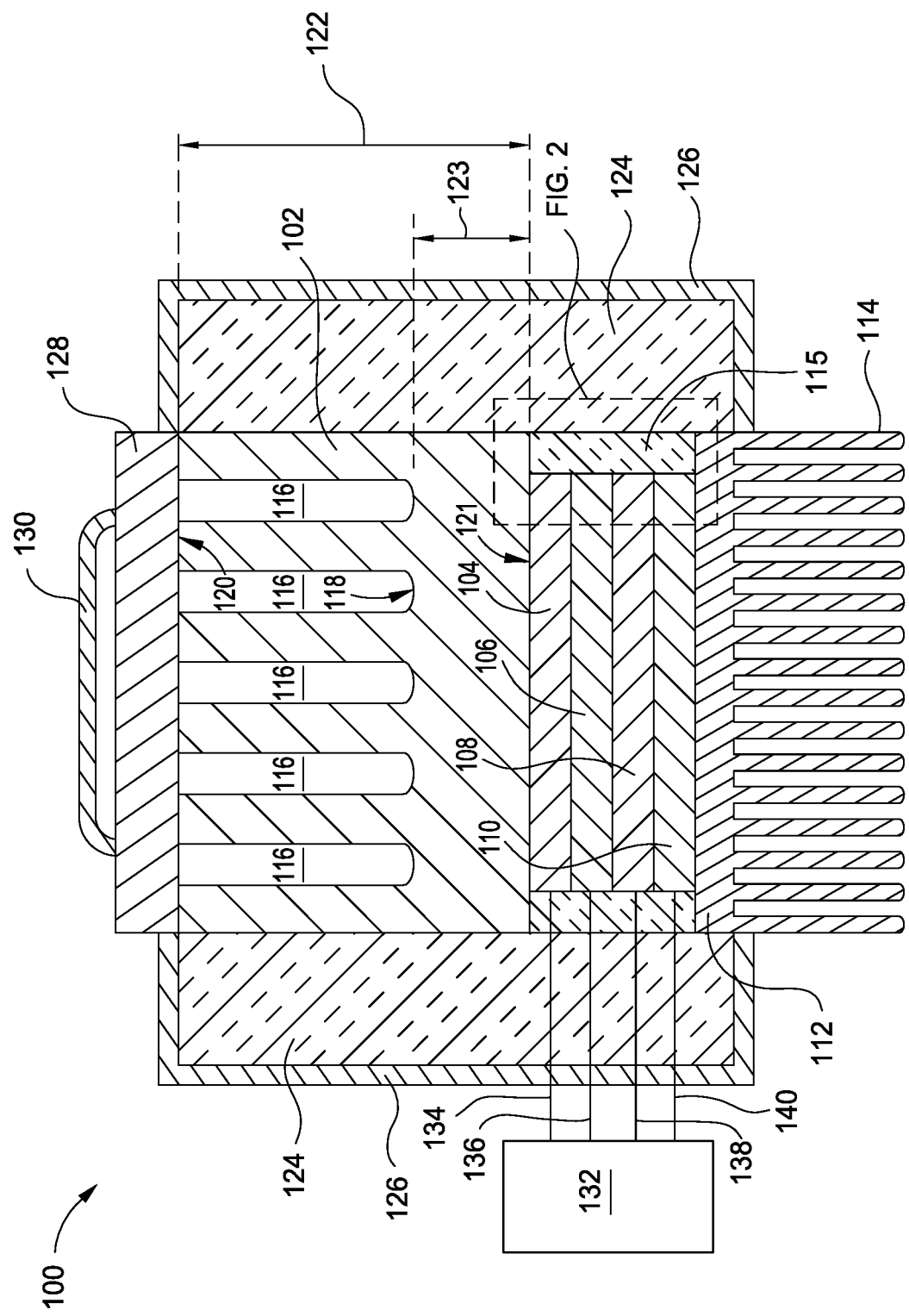
FIG. 1 illustrates a schematic cross-sectional view of a temperature modulation apparatus according to an embodiment described herein.

FIG. 1 illustrates a schematic cross-sectional view of a temperature modulation apparatus 100 according to an embodiment described herein. The apparatus 100 includes a sample block 102, a plurality of thermoelectric modules (TEMs) 104, 106, 108, 110, and a cooling block 112. The sample block 102 is configured to hold or otherwise position material samples during temperature modulation of the samples. Examples of material samples include various biological materials, such as tissues, fluids, and the like. Other samples may include portions of or entire vertebrates, arthropods, or other organisms.

The sample block 102 includes a first surface 120 and a second surface 121 oriented opposite the first surface 120. One or more wells 116 are formed in the sample block 102 and extend from the first surface 120 into the sample block 102. In one embodiment, the wells 116 are shaped to accommodate a vial. In another embodiment, the wells (not shown) are shaped to accommodate a petri dish. In other embodiments, the wells (not shown) are shaped to accommodate PCR plate holders, reaction vessels, or other fluid containers. It is contemplated that the shape, size, positioning, orientation, and depth of the wells 116 may be selected to accommodate various different samples. While a plurality of wells 116 are illustrated, a single well 116 is contemplated in one embodiment. The positioning of the wells 116 in the sample block 102 enable visualization of samples within the wells 116 during exposure to temperature modulation.

Visualization of samples during exposure to temperature modulation is believed to be advantageous in order to observe physical, behavioral, and other characteristics of samples, such as biological specimens. Such wells 116 also enable utilization of live biological specimens, whereas conventional systems which utilize submersion in a fluid bath reduce the ability of visualization of the specimen during exposure to temperature modulation. Moreover, the ability to visualize specimens in a non-liquid medium, which may be more similar to the specimens natural environment, further improves data collection and analysis.

A thickness 122 of the sample block extending between the first surface 120 and the second surface 121 is selected to provide desirable temperature modulation characteristics, such as a ramp rate and ability to hold a constant temperature. In one embodiment, the thickness 122 is between about 0.25 inches and about 3 inches. In one embodiment, the sample block 102 has a reduced thickness, such as about 1 inch or less, and provides for an improved temperature ramping rate. In other words, a temperature of the sample block 102 is capable of fluctuating more rapidly when compared to a sample block 120 with a greater thickness. In another embodiment, the sample block 102 has an increased thickness, such as about 2 inches or greater. In this embodiment, a thermal mass of the sample block 102 is greater which enables the sample block 102 to more easily maintain a constant temperature.

A bottom surface 118 of the wells 116 is recessed from the first surface 120. In one embodiment, the bottom surface 118 is rounded, for example, having a parabolic or arcuate cross-section. In another embodiment, the bottom surface (not shown) is planar or substantially planar. A thickness 123 of the sample block 102 extending between the bottom surface 118 and the second surface 121 is selected to further influence temperature modulation characteristics of the sample block 102. For example, if the thickness 123 is relatively small, more rapid temperature change of the sample block 102 is contemplated. In another example, if the thickness 123 is relatively large, the increased thermal mass of the sample block 102 between the plurality of TEMs and the bottom surface 118 enables improved maintenance of a constant temperature, such as a temperature set point.

In one embodiment, the sample block 102 is fabricated from a metallic material. For example, the sample block 102 may be fabricated from an aluminum material, a brass material, a copper material, a stainless steel material, an alloys and combinations thereof. The material utilized to fabricate the sample block 102 is selected to have a coefficient of thermal conductivity suitable to reduce thermal losses and improve thermal conductivity between the TEMs 104, 106, 108, 110 and the wells 116.

The plurality of TEMs 104, 106, 108, 110 are disposed in a stacked arrangement. A first TEM 104 is disposed adjacent to and coupled to the second surface 121 of the sample block 102. In one embodiment, the first TEM 104 is sized to approximate an area of the second surface 121. In another embodiment, the first TEM 104 is sized to be less than the surface area of the second surface 121. A second TEM 106 is disposed adjacent to and coupled to the first TEM 104. The second TEM 106 is coupled to the first TEM 104 opposite the second surface 121 of the sample block 102. In one embodiment, the second TEM 106 is sized approximately equal to a size of the first TEM 104.

A third TEM 108 is disposed adjacent to and coupled to the second TEM 106. The third TEM 108 is coupled to the second TEM 106 opposite the first TEM 104. In one embodiment, the third TEM 108 is sized approximately equal to the size of both the first TEM 104 and the second TEM 106. A fourth TEM 110 is disposed adjacent to and coupled to the third TEM 108. The fourth TEM 110 is coupled to the third TEM 108 opposite the second TEM 106. In one embodiment, the fourth TEM 110 is sized approximately equal to the size of each of the first TEM 104, the second TEM 106, and the third TEM 108.

As described therein TEM is a thermoelectric temperature modulation apparatus which utilizes the Peltier effect to create a heat flux between the junction of two different types of materials. For example, the TEMs described herein may be semiconductor solid state devices which transfer heat from one side of the TEM to an opposite side of the TEM depending upon the direction of an applied current. In one embodiment, the TEMs are utilized for cooling. In another embodiment, the TEMs are utilized for heating. TEMs described herein may also be considered a Peltier device, a Peltier heat pump, a solid state refrigerator, or a thermoelectric cooler or the like.

A proportional-integrative-derivative (PID) controller 132 is disposed in electrical communication with the TEMs 104, 106, 108, 110 as shown in FIG. 1. The PID controller 132 is configured to control the current delivered to the TEMs which influences the cooling and/or heating of the sample block 102. In one embodiment, the PID controller 132 includes a rocker switch which is utilized to reverse polarity of the current applied to the TEMs 104, 106, 108, 110. By changing the polarity of the current, the PID controller 132 can cause the TEMs 104, 106, 108, 110 to either heat or cool the sample block 102.

An example of a suitable PID controller is the SYL-2352 PID Temperature Controller available from Auber Instruments. In one embodiment, the first TEM 104 is in electrical communication with the PID controller 132 via a first electrical conduit 134. The second TEM 106 is in electrical communication with the PID controller 132 via a second electrical conduit 136. The third TEM 108 is in electrical communication with the PID controller 132 via a third electrical conduit 138. The fourth TEM 110 is in electrical communication with the PID controller 132 via a fourth electrical conduit 140.

Although individual conduits 134, 136, 138, 140 are illustrated for each of the TEMs 104, 106, 108, 110, it is contemplated that a single electrical conduit may be utilized to control the TEMs 104, 106, 108, 110. At a distal end of each of the conduits 134, 136, 138, 140 coupled to respective TEMs 104, 106, 108, 110, a thermocouple is disposed in contact with each of the TEMs 104, 106, 108, 110 to provide temperature feedback to the PID controller 132. In another embodiment, one or more thermocouples are disposed in contact with the sample block 102, for example, in contact with either or both of the first surface 120 and second surface 121. In another embodiment, the one or more thermocouples are disposed in the wells 116. Examples of suitable thermocouples include a T-type thermocouple, a K-type thermocouple, a J-type thermocouple, and an S-type thermocouple, or the like.

The PID controller 132 is disposed apart from the TEMs 104, 106, 108, 110 outside of a housing 126 which encases the temperature modulation apparatus 100. The PID controller 312 also includes a solid state relay and a heat sink. A suitable solid state relay is the MGR-1D4840 available from MAGER. A suitable heat sink is the HS25 SSR heat sink available from Mouser Electronics. A power supply, such as a 30 Amp, 12 Volt, DC regulated power supply is also in electrical communication with the PID controller 132. It is contemplated that other suitable power sources may be utilized to power the PID controller 132 and the apparatus 100. In certain embodiments, the PID controller 132 also includes a fan for cooling of the PID controller 132.

Each of the electrical conduits 134, 136, 138, 140 extend from the respective TEMs 104, 106, 108, 110 through a first insulation material 115, a second insulation material 124, and the housing 126. Other pathways of the electrical conduits 134, 136, 138, 140 through different portions of the apparatus 100 are also contemplated.

The cooling block 112 is coupled to the plurality of TEMs 104, 106, 108, 110, and more specifically, the TEM positioned furthest form the second surface 121 of the sample block 102, such as the fourth TEM 110. The cooling block 112 functions to draw heat from the plurality of TEMs 104, 106, 108, 110 in a direction away from the sample block 102. In one embodiment, the cooling block 102 is fabricated from a metallic material. For example, the cooling block 112 may be fabricated from an aluminum material, a brass material, a copper material, a stainless steel material, and alloys and combinations thereof. In one embodiment, the cooling block 112 is sized to approximate the surface area of the second surface 121 of the sample block 102.

A plurality of fins 114 are coupled to and extend from the cooling block 112. In one embodiment, the cooling block 112 is monolithic and the fins 114 are machined from the monolithic block as illustrated in FIG. 1. In another embodiment, the cooling block 112 is plate like and the fins 114 are attached to the plate opposite the plurality of TEMs 104, 106, 108, 110. In both embodiment, the fins 114 are configured to increase the surface area of the cooling block 112 to facilitate heat transfer away from the TEMs 104, 106, 108, 110.

It is contemplated that the fins 114 may utilize any variety of configurations selected to increase the surface area of the cooling block 112. In one embodiment, the cooling block 112 and the fins 114 extending therefrom are configured to be air cooled. In another embodiment, the cooling block 112 and the fins 114 are configured to be liquid cooled. For example, the fins 114 may be disposed in an alcohol bath, such as an ethanol or methanol bath. In another embodiment, the fins 114 may be disposed in an ethylene glycol bath.

Figure 2:
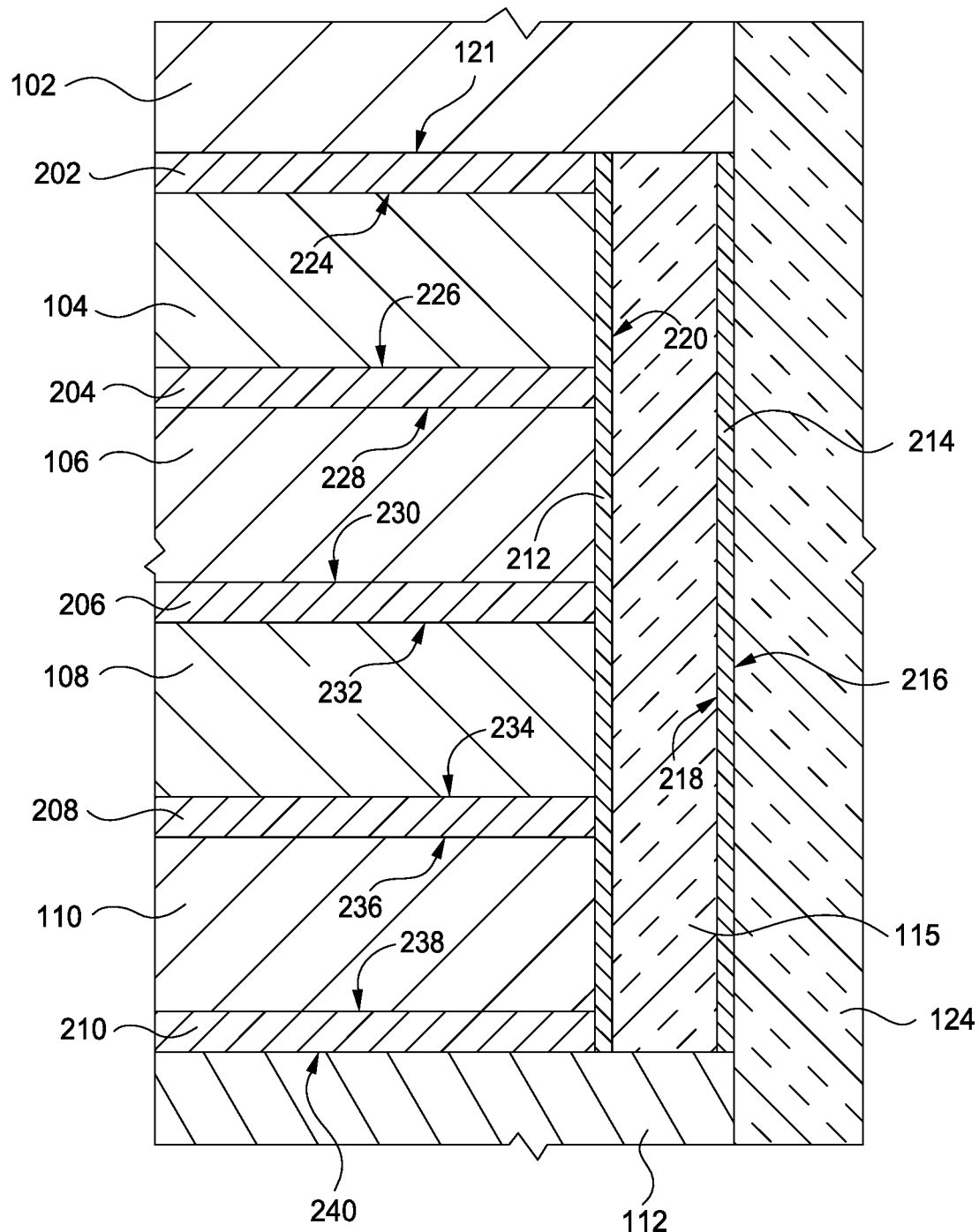
FIG. 2 illustrates a detailed enlargement of a portion of the apparatus of FIG. 1 according to an embodiment described herein.

The first insulation material 115 is fabricated from a foam material. The foam material, which will be described in greater detail with regard to FIG. 2, is positioned and configured to insulate the TEMs 104, 106, 108, 110 within the apparatus 100. For example, the first insulation material 115 is configured to facilitate a more vertical thermal conductivity profile to improve the efficiency of heat transfer from the sample block 102 to the cooling block 112. The first insulation material 115 is disposed around the TEMs 104, 106, 108, 110. In one embodiment, the first insulation material 115 is disposed radially outward of the TEMs 104, 106, 108, 110. The first insulation material 115 is positioned adjacent to the TEMs 104, 106, 108, 110 and the first insulation material 115 extends between the second surface 121 of the sample block 102 and the cooling block 112.

The second insulation material 124 surrounds each of the sample block 102, the TEMs 104, 106, 108, 110, the first insulation material 115, and at least a portion of the cooling block 112. For example, the second insulation material 124 is disposed radially outward of and encompasses the sample block 102, the TEMs 104, 106, 108, 110, the first insulation material 115, and at least a portion of the cooling block 112 therein. In one embodiment, the second insulation material 124 is fabricated from a foam material, such as a high density foam, for example, a high density polyethylene material. Other examples of suitable foam materials include polyurethane foam materials and latex foam materials. The second insulation material 124 is configured to improve the efficiency of heat transfer within the apparatus 100 from the sample block 102 to the cooling block 112.

The housing 126 is formed from a polymeric material, such as a plastic polymer material. The housing 126 surrounds the second insulation material 124. In one embodiment, the second insulation material 124 is adhered to the housing 126. In another embodiment, the second insulation material 124 is removably coupled to the housing 126. The housing 126 is configured to encase and protect the apparatus 100 and ease transport of the apparatus. It is contemplated that the apparatus 100 may weight about 10 pounds or less, thus making the apparatus easily portable. It is contemplated that due to the weight of the apparatus 100 and the ease of portability, the apparatus 100 may find advantageous utilization in various field implementations in addition to bench type applications.

A lid 128 is removably coupled to the apparatus 100. More specifically, the lid 128 is removably coupled to the sample block 102. In one embodiment, the lid 128 is fabricated from a material similar to the materials utilized to fabricate the sample block 102. In another embodiment, the lid 128 is fabricated from a material similar to the material utilized to fabricate the housing 126. Although not illustrated, the lid 128 may be latched to the housing 126 or the sample block 102 to enable securing of the lid 128 to the apparatus 100. The lid 128 also includes a handle 130 coupled thereto. The lid 128, when coupled to the sample block 102, is configured to secure samples disposed within the wells 116 of the sample block 102. The lid 128 may also further function to insulate the sample block 102 from ambient environmental conditions.

FIG. 2 illustrates a detailed enlargement of a portion of the apparatus 100 of FIG. 1 according to an embodiment described herein. A first thermal paste layer 202 is disposed between the second surface 121 of the sample block 102 and a first surface 224 of the first TEM 104. A second thermal past layer 204 is disposed between a second surface 226 of the first TEM 104 and a first surface 228 of the second TEM 106. A third thermal paste layer 206 is disposed between a second surface 230 of the second TEM 106 and a first surface 232 of the third TEM 108. A fourth thermal paste layer 208 is disposed between a second surface 234 of the third TEM 108 and a first surface 236 of the fourth TEM 110. A fifth thermal paste layer 210 is disposed between a second surface 238 of the fourth TEM 110 and a top surface 240 of the cooling block 112.

Each of the thermal paste layers 202, 204, 206, 208, 210 is configured to provide a thermally conductive contact between each of the TEMs 104, 106, 108, 110 and the second surface 121 of the sample block 102 and the top surface 240 of the cooling block. In this manner, more efficient heat transfer from the sample block 102 through the TEMs 104, 106, 108, 110 to the cooling block 112 is achieved. A thickness of each of the thermal past layers 202, 204, 206, 208, 210 is selected to prevent the layers 202, 204, 206, 208, 210 from acting as an insulator.

In one embodiment, the thermal paste layers 202, 204, 206, 208, 210 are a metallic thermal paste material. In another embodiment, the thermal paste layers 202, 204, 206, 208, 210 include a silver material, a zinc oxide material, and a boron nitride material. One example of a thermal paste material suitable for utilization as the thermal paste layers 202, 204, 206, 208, 210 is ARCTIC SILVER® 5 available from Arctic Silver Incorporated. In certain embodiments, a viscosity agent, such as mineral oil or the like, is added to the thermal paste material as part of the thermal paste layers 202, 204, 206, 208, 210 to improve the viscosity of the thermal paste layers 202, 204, 206, 208, 210.

The first insulation material 115, which extends along the TEMs 104, 106, 108, 110 between the sample block 102 and the cooling block 112 and is disposed between the TEMs 104, 106, 108, 110 and the second insulation material 124, includes an adhesive film 212 and a reflective film 214. The adhesive film 212 is disposed on a first surface 220 of the first insulation material 115 which is disposed adjacent the TEMs 104, 106, 108, 110. The adhesive film 212 is configured to bond the first insulation material 115 to the TEMs 104, 106, 108, 110.

In one embodiment, the reflective film 214 is a thermally reflective film. For example, the reflective film 214 is fabricated from a metallic foil. The reflective film 214 is coupled to a second surface 218 of the first insulation material 115. In one embodiment, the second insulation material 124 is disposed in contact with the reflective film 214. The reflective film 214 is believed to prevent or substantially reduce lateral transfer of heat from the TEMs 104, 106, 108, 110 through the first insulation material 115. As a result, more efficient thermal conductivity between the sample block 102 and the cooling block 112 is achieved.

Figure 3:
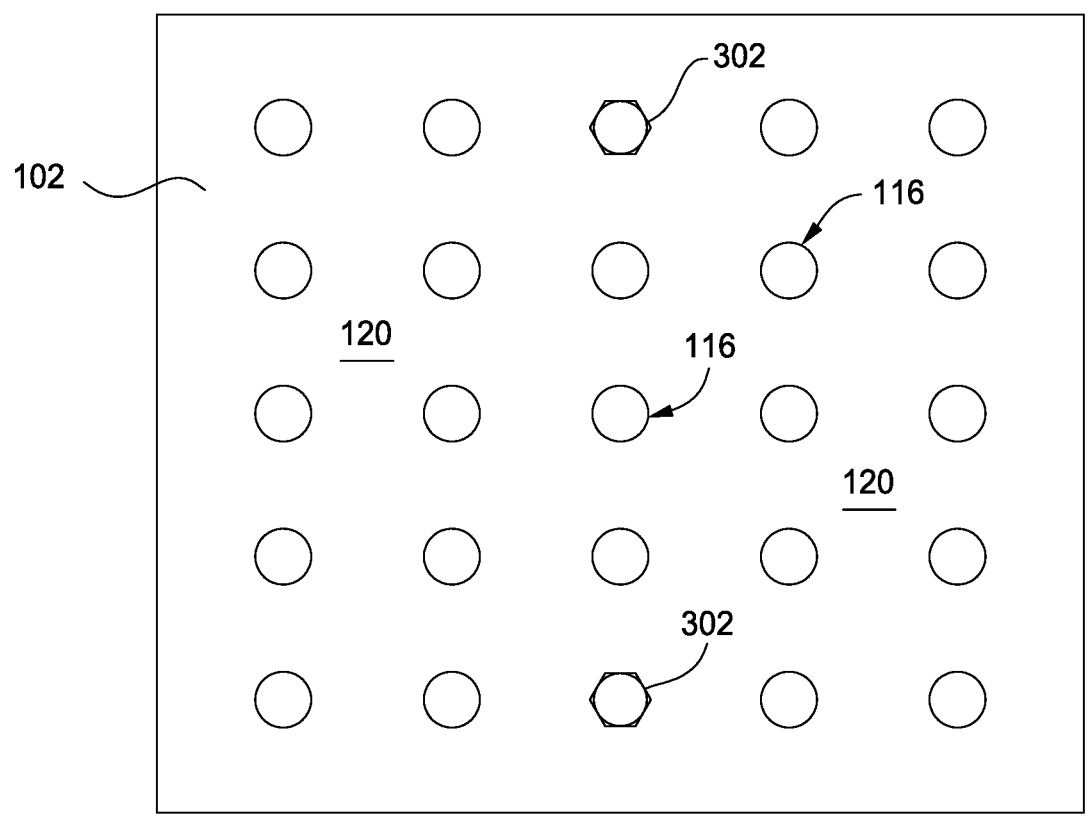
FIG. 3 illustrates a schematic plan view of a sample block having a plurality of wells formed therein according to an embodiment described herein.

FIG. 3 illustrates a schematic plan view of the sample block 102 having the plurality of wells 116 formed therein according to an embodiment described herein. As described above, the wells 116 are formed in the first surface 120 of the sample block 102. The wells 116 are arranged in a grid like pattern, however other arrangements and orientations of the wells 116 are contemplated, depending upon the desirable implementation.

A plurality of bolts 302, such as two bolts, are disposed through the sample block 102 and extend from the first surface 120 through the sample block 102, the plurality of TEMs 104, 106, 108, 110, and the cooling block 112 to secure the aforementioned elements together. A bore (not illustrated) within which the bolts 302 are disposed has a tolerance which is selected to accommodate expansion of the sample block materials when subjected to thermal cycling. It is contemplated that the apparatus 100 is capable of cooling to temperature of about −55° C. and heating to temperatures of about 65° C. As such, the tolerances of the bores are suitable for accommodating material expansion over a temperature range of greater than about 100° C.

Figure 4:
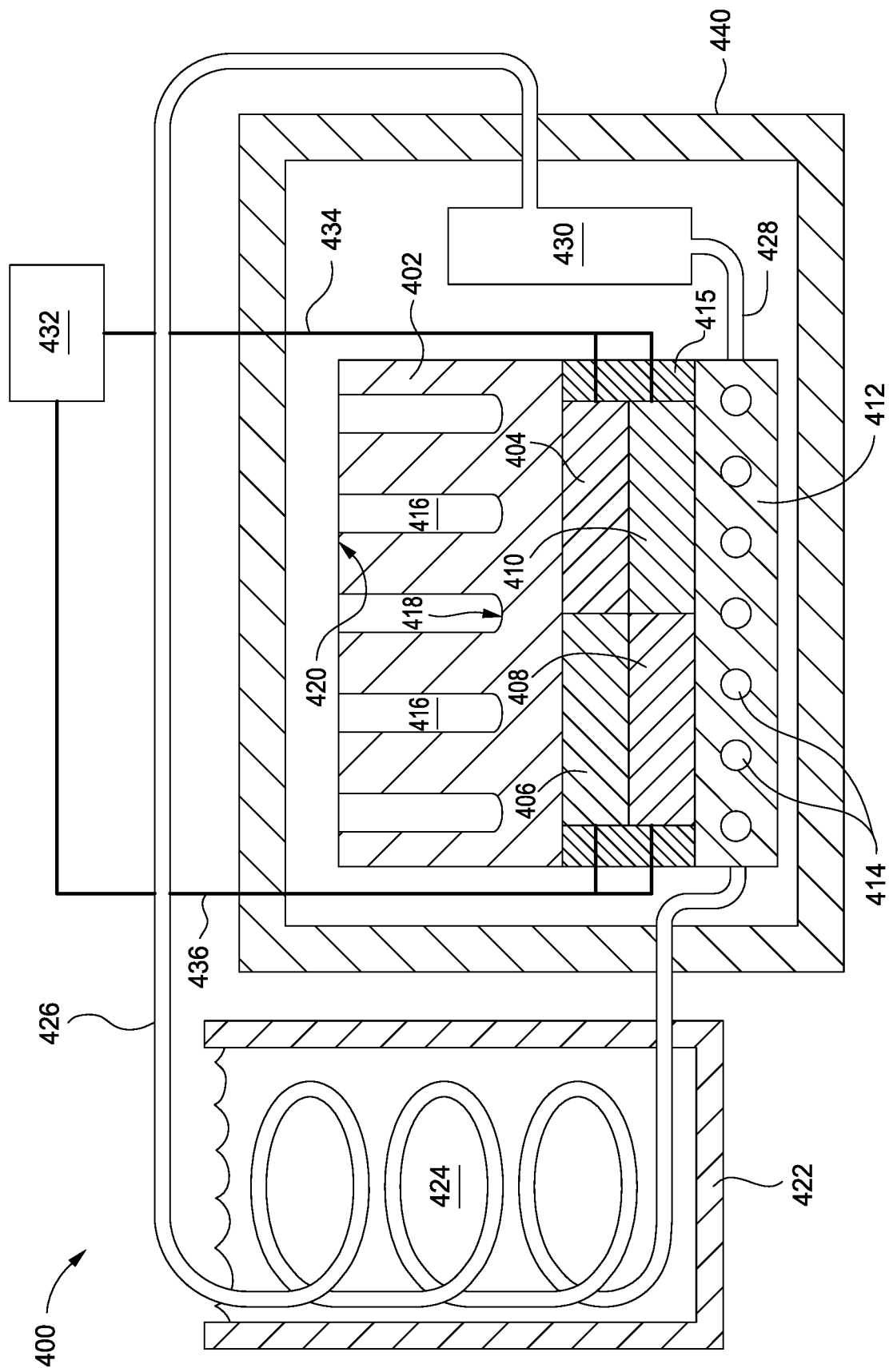
FIG. 4 illustrates a schematic cross-sectional view of a temperature modulation apparatus according to an embodiment described herein.

FIG. 4 illustrates a schematic cross-sectional view of a temperature modulation apparatus 400 according to an embodiment described herein. The apparatus 400 includes a sample block 402, a plurality of TEMs 404, 406, 408, 410, and a cooling block 412. The sample block 402 is similar or identical to the sample block 102. Similarly, the TEMS 404, 406, 408, 410 are similar to or identical to the TEMs 104, 106, 108, 110. In one embodiment, a first TEM 404 is disposed adjacent the sample block 402 and a second TEM 406 is disposed adjacent to the sample block 402 and the first TEM 404. A third TEM 408 is coupled to the second TEM 406 and disposed in a stacked arrangement with the second TEM 406. Similarly, a fourth TEM 410 is coupled to the first TEM 404 and disposed in a stacked arrangement with the first TEM 410.

A first insulation material is coupled to the TEMs 404, 406, 408, 410 and extends between the sample block 402 and the cooling block 412. In one embodiment, the first insulation material 415 is similar to or identical to the first insulation material 415 described with regard to FIG. 1 and FIG. 2. The cooling block 412 is fabricated from a metallic material, such as the materials described with regard to the cooling block 112 with regard to FIG. 1. However, the cooling block 412 has a channel 414 formed therein which is configured to receive a thermal transfer fluid therein. The cooling block 412 and channel 414 are described in greater detail with regard to FIG. 6A and FIG. 6B.

A PID controller 432 of FIG. 4, which may be similar to the PID controller 132, is in electrical communication with the TEMs 404, 406, 408, 410 via a plurality of electrical conduits 434, 436. In one embodiment, a first electrical conduit 434 is coupled to the first TEM 404 and the fourth TEM 410 which are disposed vertically adjacent to a first region of the sample block 402. In this embodiment, a second electrical conduit 436 is coupled to the second TEM 406 and the third TEM 408 which are disposed vertically adjacent to a second region of the sample block 402 different than the first region. It is contemplated that each of the TEMs 404, 406, 408, 410 may each be coupled to the PID controller 432 by a respective electrical conduit or each of the TEMs 404, 406, 408, 410 may all be coupled to the PID controller 432 by a single electrical conduit, depending upon the desired implementation. Similar to the PID controller 132, the PID controller 432 is disposed outside of the housing 440.

The housing 440 surrounds and encompasses the cooling block 402, the TEMs 404, 406, 408, 410, the first insulation material 415, and the cooling block 412. In one embodiment, the housing 440 is fabricated from a material similar to the second insulation material 124. In another embodiment, the housing 440 is fabricated from a material similar to the housing 126. In yet another embodiment, the housing 440 includes both materials similar to the second insulation material 125 and the housing 126. The housing 440 is configured to insulate and/or protect the elements of the apparatus 400.

A pump 430 is disposed within the housing 440. The pump 430 is in fluid communication with the cooling block 412 via a first conduit 426 which extends from the pump 430 to the cooling block 412 and a second conduit 428 which extends from the cooling block 412 to the pump 430. The conduits 426, 428 are configured to transfer a fluid therein and, in one embodiment, are fabricated from a metallic material, such as copper. In another embodiment, the conduits 426, 428 are fabricated from a polymeric material. Although not illustrated, in another embodiment, the pump 430 is disposed outside the housing 440.

A first thermal transfer fluid, such as water, alcohol, ethylene glycol, and combinations and mixtures thereof are flowed through the conduits 426, 428 and the channels 414 of the cooling block 412 by the pump 430. A portion of the first conduit 426 passes through a fluid reservoir 422. The fluid reservoir 422 is disposed outside of the housing 440 and is filled with a second heat transfer fluid 424. In one embodiment, the second heat transfer fluid 424 in the fluid reservoir 422 is the same as the first thermal transfer fluid flowed through the conduit 428, 428, and the channels 414 of the cooling block 412.

A portion of the first conduit 426 extending through the fluid reservoir 422 is disposed is a coiled arrangement. The coiled arrangement of the portion of the first conduit 426 in the fluid reservoir 422 increases the residence time of the first thermal transfer fluid in the reservoir 422 in order to increase the amount of heat removed from the first thermal transfer fluid. The first thermal transfer fluid, after being cooled in the second thermal transfer fluid 424, travels through the first conduit 426 to the cooling block 412. The first thermal transfer fluid cools and or removes heat from the cooling block 412 until the first thermal transfer fluid enters the second conduit 428 and is flowed to the pump 430 whereby the first thermal transfer fluid re-enters the first conduit 426 and the process is repeated.

Figure 5:
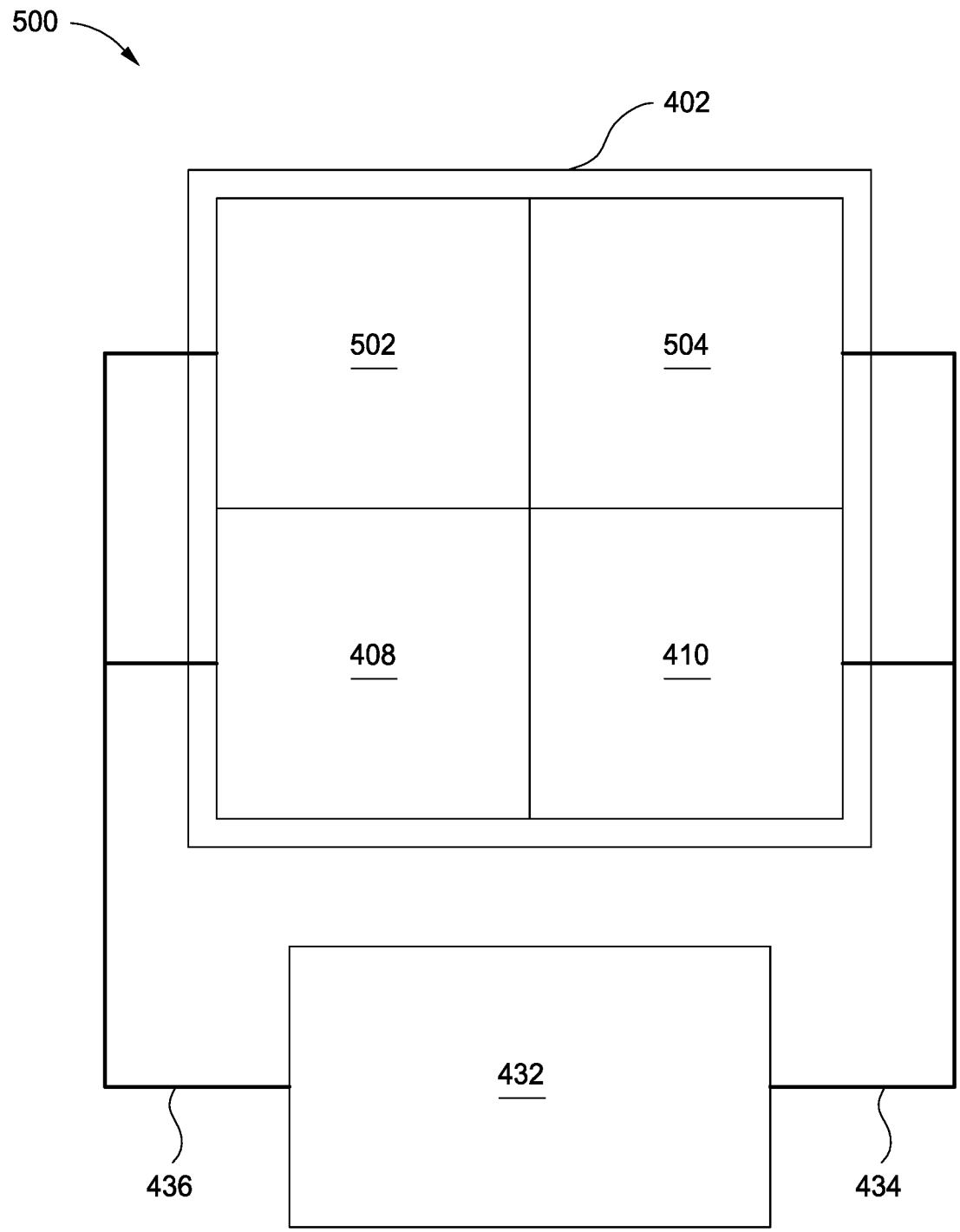
FIG. 5 illustrates a schematic bottom view of a sample block with a plurality of thermoelectric modules coupled to different regions of the sample block according to an embodiment described herein.

FIG. 5 illustrates a schematic bottom view of the sample block 402 with a plurality of TEMs 408, 410, 502, 504 coupled to different regions of the sample block 402 according to an embodiment described herein. In the illustrated embodiment, the third TEM 408 (which may be a single TEM or may include the second TEM 406 of FIG. 4 which is not visible in this view disposed in a stacked arrangement) approximates a first region corresponding to a first quadrant of the sample block 402. The fourth TEM 410 (which may be a single TEM or may include the first TEM 404 of FIG. 4 which is not visible disposed in a stacked arrangement) approximates a second region corresponding to second quadrant of the sample block 402.

A fifth TEM 502, which may be a single TEM or a plurality of TEMs arranged in a stacked arrangement, approximates a third region corresponding to a third quadrant of the sample block 402. A fifth TEM 504, which may be a single TEM or a plurality of TEMs arranged in a stacked arrangement, approximates a fourth region corresponding to a fourth quadrant of the sample block 402.

Each of the TEMs 408, 410, 502, 504 are coupled to the sample block 402 at different regions which enables regional temperature control of the sample block 402. Thus, maintaining different regions of the sample block 402 at different temperatures is enabled according to the embodiments described herein. While a quadrant arrangement is illustrated, it is contemplated that various other types of regional arrangements may be implemented. For example, one region, two regions, three regions, four region, five regions, six regions, and so on are contemplated and may be implemented by positioning different TEMs are suitable locations to enable regional temperature control of the sample block 402. It is also contemplated that the TEMs are spaced apart from one another along the sample block 402 to generate a temperature gradient across the sample block 402.

In the above embodiments, the PID controller 432, and associated electrical conduits enabling electrical communication between the TEMs 408, 410, 502, 504 and the PID controller 432, is configured to selectively control each of the TEMs such that the different regions of the sample block 402 are individually controlled.

Figure 6A:
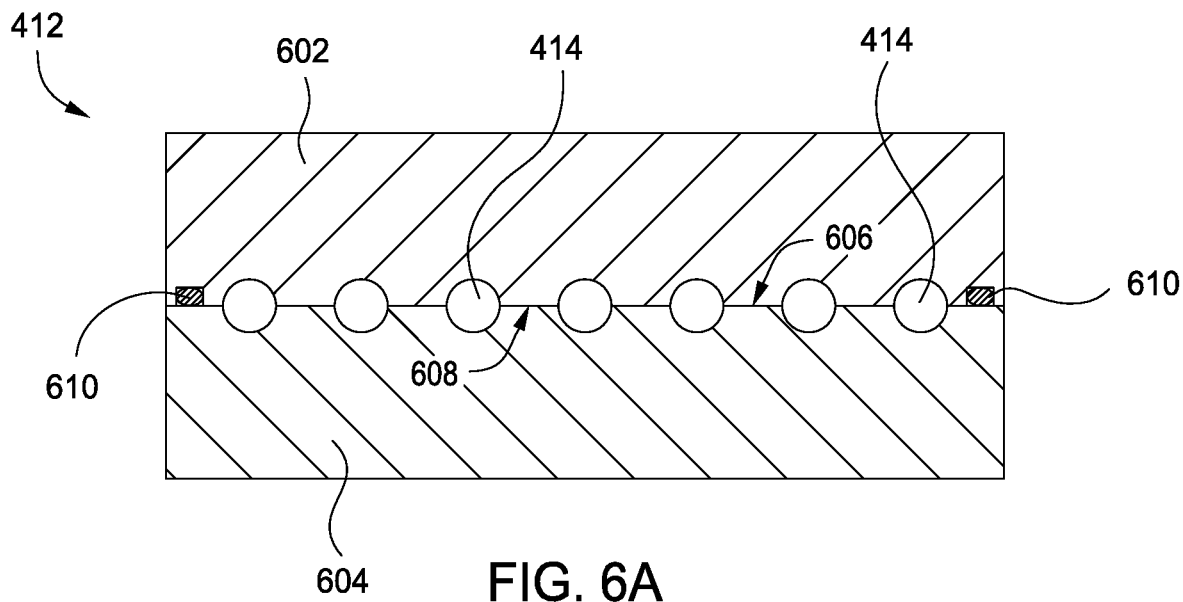
FIG. 6A illustrates a schematic cross-sectional view of a cooling block according to an embodiment described herein.

FIG. 6A illustrates a schematic cross-sectional view of the cooling block 412 according to an embodiment described herein. The cooling block 412 includes a first portion 602 having a first surface 606 and a second portion 604 having a second surface 608. Recesses are formed in the first surface 606 of the first portion 602 and the second surface 608 of the second portion 604 such that when the first portion 602 and the second portion 604 are joined, the channels 414 are formed. In one embodiment, the channels 414 have a substantially circular cross-section. In other embodiments, a cross-sectional shape of the channels 414 is polygonal.

A seal member 610 is coupled to the first portion 602 to ensure a fluid tight seal between the first portion 602 and the second portion 604. Although not illustrated, the seal member 610 may be coupled to the second portion 604. In certain embodiments, the seal member 610 is optional.

Figure 6B:
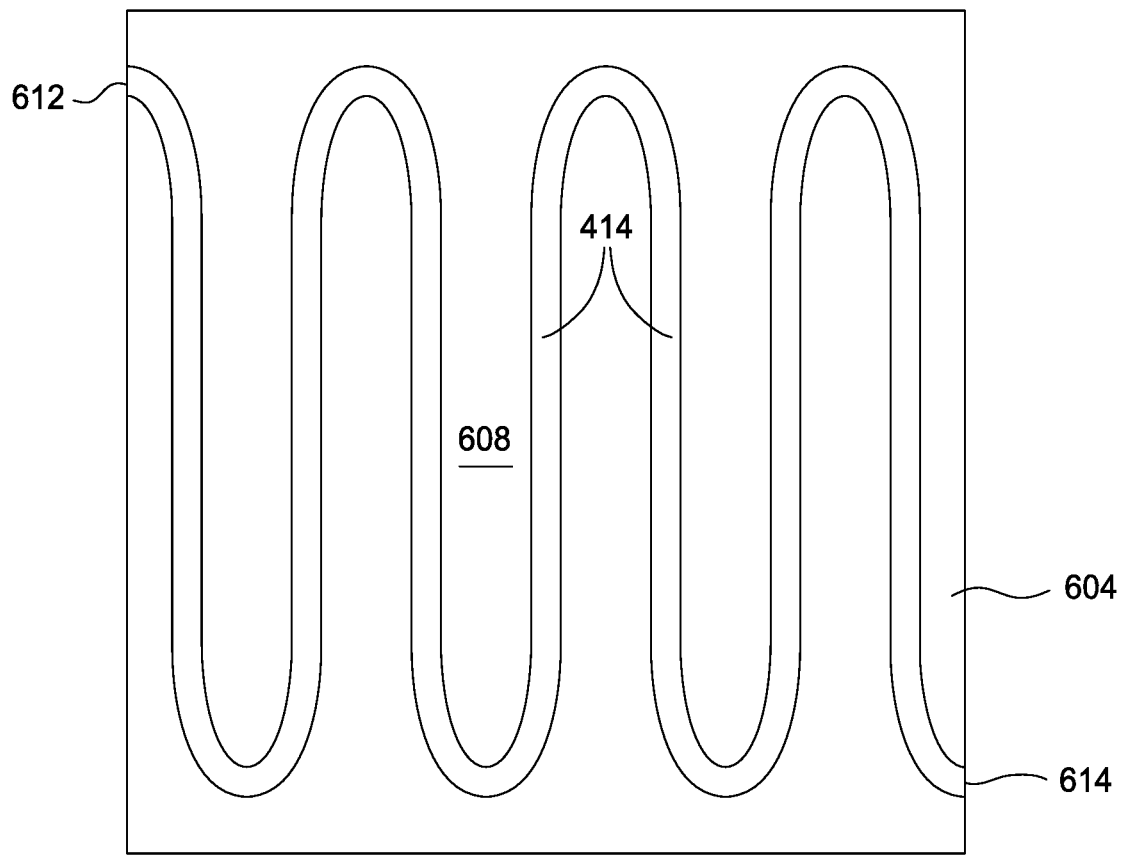
FIG. 6B illustrates a schematic plan view of a portion of the cooling block of FIG. 6A according to an embodiment described herein.

FIG. 6B illustrates a schematic plan view of the second portion 604 of the cooling block of FIG. 6A according to an embodiment described herein. The first portion 602 is removed in FIG. 6B to illustrate a pathway of the channels 414. In the illustrated embodiment, the channels 414 are a single channel which extends through the cooling block 412 from an inlet 612 to an outlet 614. The orientation of the pathway of the channels 414 is selected to increase a residence time of fluid flowing through the channels 414. The orientation of the pathway may be a serpentine path, a tortured path, or other pathway which traverses the cooling block 412.

Embodiments described herein provide for an improved cooling and heating apparatus for temperature modulation of samples. Advantageously, the apparatus described herein provide temperature modulation over a large temperature range with the ability to finely control temperatures with a margin of error within about +/−0.2° C. Apparatus described herein is portable and enables visualization of samples during exposure to temperature modulation. Accordingly, improved data collection of various sample types resulting from temperature modulation exposure may be realized in accordance with the embodiments described herein.

While the foregoing is directed to embodiments of the present disclosure, other and further embodiments of the disclosure may be devised without departing from the basic scope thereof, and the scope thereof is determined by the claims that follow.

What is claimed is:

1. A temperature modulation apparatus, comprising:
  a sample block having a plurality of wells formed in a first surface of the sample block;
  a plurality of thermoelectric modules coupled to a second surface of the sample block opposite the first surface, wherein the plurality of thermoelectric modules are disposed in a stacked arrangement;

a cooling block coupled to the plurality of thermoelectric modules opposite the sample block;

a first insulation material coupled to the plurality of thermoelectric modules, the first insulation material extending between the second surface of the sample block and the cooling block; and a second insulation material comprising an adhesive film and a reflective material, the second insulation material surrounding the sample block, the first insulation material, and at least a portion of the cooling block.

2. The apparatus of claim 1, wherein the sample block is formed from a material selected from the group consisting of aluminum, copper, and brass.

3. The apparatus of claim 2, wherein a thickness of the sample block is between about 0.25 inches and about 3 inches.

4. The apparatus of claim 1, wherein the cooling block comprises a plurality of fins extending from the cooling block opposite the plurality of thermoelectric modules.

5. The apparatus of claim 1, wherein the cooling block has a serpentine channel formed therein.

6. The apparatus of claim 1, wherein a first surface of the first insulation material coupled to the plurality of thermoelectric modules is coated with an adhesive.

7. The apparatus of claim 6, wherein a second surface of the first insulation material disposed opposite the first surface of the first insulation material is coated with the reflective material.

8. The apparatus of claim 7, wherein the thermally reflective material is a metal foil.

9. The apparatus of claim 1, further comprising:
a layer of metallic thermal paste disposed between each thermoelectric module of the plurality of thermoelectric modules.

10. The apparatus of claim 9, wherein a layer of the metallic thermal paste is disposed between the second surface of the sample block and one thermoelectric module of the plurality of thermoelectric modules disposed adjacent the second surface of the sample block.

11. The apparatus of claim 10, wherein a layer of the metallic thermal paste is disposed between the cooling block and one thermoelectric module of the plurality of thermoelectric modules disposed adjacent the cooling block.

12. The apparatus of claim 9, wherein the metallic thermal paste comprises silver, zinc oxide, and boron nitride.

13. The apparatus of claim 1, further comprising:
a proportional-integrative-derivative controller coupled to the plurality of thermoelectric modules.

14. The apparatus of claim 1, further comprising:
a housing surrounding the second insulation material.

15. The apparatus of claim 14, further comprising:
a lid removably coupled to the sample block.

16. A temperature modulation apparatus, comprising:
a metallic sample block having a first surface and a second surface disposed opposite the first surface, wherein the first surface has one or more wells formed therein;
a plurality of thermoelectric modules coupled to the second surface of the sample block, wherein each thermoelectric module of the plurality of thermoelectric modules is coupled to a different region of the second surface;
a cooling block coupled to the plurality of thermoelectric modules opposite the sample block;
a first insulation material coupled to the plurality of thermoelectric modules; and a second insulation material comprising an adhesive film and a reflective material, the second insulation material disposed radially outward of the sample block, the first insulation material, and the cooling block.

17. The apparatus of claim 16, wherein the plurality of thermoelectric modules includes two or more thermoelectric modules disposed in a stacked arrangement for each region of the second surface of the sample block.

18. The apparatus of claim 16, wherein the sample block and the cooling block are formed from the same material.

19. The apparatus of claim 16, wherein the first insulation material is coupled to the plurality of thermoelectric modules by an adhesive material.

20. The apparatus of claim 19, wherein the first insulation material comprises a thermally reflective layer disposed opposite the adhesive material.

21. The apparatus of claim 16, further comprising:
a first thermal paste layer disposed between the second surface of the sample block and one or more of the plurality of thermoelectric modules; and
a second thermal paste layer disposed between the one or more of the plurality of thermoelectric modules and the cooling block.

22. The apparatus of claim 16, further comprising:
a proportional-integrative-derivative controller coupled to the plurality of thermoelectric modules.

23. The apparatus of claim 16, wherein the cooling block comprises a first portion coupled to a second portion, wherein a serpentine channel is formed between the first portion and the second portion.

24. The apparatus of claim 16, further comprising:
a reservoir configured for fluid communication with the cooling block; and
a pump configure for fluid communication with the reservoir.

25. The apparatus of claim 24, wherein a first conduit extends between the pump and the cooling block and a second conduit extends between the cooling block and the pump.

26. The apparatus of claim 25, wherein a portion of the first conduit is disposed within the reservoir, and wherein the portion of the first conduit disposed within the reservoir is disposed in a coiled configuration.

27. A temperature modulation apparatus, comprising:
an aluminum sample block;
an aluminum cooling block;
a plurality of thermoelectric modules disposed in a stacked arrangement and positioned between the sample block and the cooling block, wherein a metal containing ceramic paste is disposed between each of the plurality of thermoelectric modules;
a first insulation material coupled to the plurality of thermoelectric modules, the first insulation material comprising:
an adhesive coupled to a first surface of the first insulation material; and
a thermally reflective material coupled to a second surface of the first insulation material;
a second insulation material comprising an adhesive film and a reflective material, the second insulation material surrounding the sample block and the plurality of thermoelectric modules;
a housing surrounding the second insulation material; and
a proportional-integrative-derivative controller in electrical communication with the plurality of thermoelectric modules, wherein the proportional-integrative-derivative controller is disposed outside of the housing.

28. The apparatus of claim 27, wherein the cooling block comprises a plurality of fins extending beyond the housing.

29. The apparatus of claim 26, wherein the cooling block is in fluid communication with a fluid reservoir.

30. The apparatus of claim 26, wherein one or more wells are formed in a surface of the sample block.

\* \* \* \* \*